(12) United States Patent
Kushwaha et al.

(10) Patent No.: US 12,726,421 B2
(45) Date of Patent: Sep. 1, 2026

(54) TRACKING IN ORDER COMPLETION OF COMMUNICATION REQUESTS BETWEEN A SOURCE DESTINATION NODE PAIR IN A LARGE AI CLUSTER

(71) Applicant: Meta Platforms, Inc., Menlo Park, CA (US)

(72) Inventors: Ved Kushwaha, Cupertino, CA (US); Arvind Srinivasan, San Jose, CA (US); Pankaj Kansal, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 18/991,253

(22) Filed: Dec. 20, 2024

(65) Prior Publication Data

US 2026/0180881 A1 Jun. 25, 2026

(51) Int. Cl.
*H04L 43/08* (2022.01)

(52) U.S. Cl.
CPC .................................... *H04L 43/08* (2013.01)

(58) Field of Classification Search
None
See application file for complete search history.

(56) References Cited

U.S. PATENT DOCUMENTS

2022/0368565 A1* 11/2022 Asai .................... H04L 12/5601
2023/0060948 A1* 3/2023 Luby ..................... H04L 1/0041
2023/0403237 A1* 12/2023 Srinivasan .............. H04L 47/34
2025/0007837 A1* 1/2025 Vaccaro .................. H04L 45/76

FOREIGN PATENT DOCUMENTS

WO WO-2020238812 A1 * 12/2020 ........... H04L 1/1864
WO WO-2022092075 A1 * 5/2022 ........... H04L 69/165

* cited by examiner

*Primary Examiner* — Chris Parry
*Assistant Examiner* — Abderrahmen Chouat
(74) *Attorney, Agent, or Firm* — Seyfarth Shaw LLP

(57) ABSTRACT

Systems and methods may include assigning a plurality of messages, associated with a request, to one or more queue pairs (QPs). In addition, a message sequence number (MSN) may be assigned to one of one or more messages of the plurality of messages. A sender global sequence number (GSN) may be assigned to one of the one or more messages. The plurality of messages may be received via a receiver. As a result, the receiver may assign a receiver GSN to one or more of the plurality of messages received. The received messages may comprise data associated with the MSN, FSN, or PSN. The receiver may track completion of the request based on the MSN assigned, via the sender. The plurality of messages may be transmitted in order, based on the MSN.

20 Claims, 8 Drawing Sheets

TRACKING IN ORDER COMPLETION OF COMMUNICATION REQUESTS BETWEEN A SOURCE DESTINATION NODE PAIR IN A LARGE AI CLUSTER

TECHNOLOGICAL FIELD

The present disclosure generally relates to methods, apparatuses, and computer program products for network monitoring, specifically to reducing latency associated with data transferred via data centers.

BACKGROUND

Large-scale data centers are the backbone of modern computing, supporting a vast array of applications and services that drive global communication, commerce, and innovation. These massive facilities are used by tech giants, cloud providers, enterprises, or the like to store, process, and distribute enormous amounts of data, enabling cloud computing, social media, e-commerce, online search, and big data analytics.

As data center technology is rapidly evolving, with advancements in areas such as artificial intelligence, machine learning, and the Internet of Things (IoT) driving demand for more powerful, efficient, and sustainable data centers. In some examples, data centers may experience delays in data transfer due to a combination of increased number of data packets being transferred and longer cable lengths. As a result, as the influx of data increases there may be an increase in round trip time (RTT) associated with the transmission of data.

As such, there may be a need for more efficient and effective techniques (e.g., approaches) that may reduce RTT associated with data transfer in data centers.

BRIEF SUMMARY

Various systems, methods, and devices are described for tracking and maintaining order of messages in large scale data centers.

In an example, systems, methods, or devices may include assigning a plurality of messages, associated with a request, to one or more queue pairs (QPs). Method may also include assigning a message sequence number (MSN) to one of one or more messages associated with a QP of the one or more QPs. Method may furthermore include assigning a sender global sequence number (GSN) to one of the one or more messages associated with the QP. The plurality of messages may be received via a receiver, where the receiver may reassemble a plurality of data packets to produce the plurality of messages sent. The receiver may assign a receiver GSN to the plurality of messages received. The method may include, tracking order of completion of the request based on the MSN assigned by the sender, wherein one or more of the plurality of messages received may comprise information associated with the MSN, packet sequence number (PSN), frame sequence number (FSN), or any other suitable information. The plurality of messages received may be transmitted in order to a platform, application, device, or the like, based on the MSN.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The summary, as well as the following detailed description, is further understood when read in conjunction with the appended drawings. For the purpose of illustrating the disclosed subject matter, there are shown in the drawings examples of the disclosed subject matter; however, the disclosed subject matter is not limited to the specific methods, compositions, and devices disclosed. In addition, the drawings are not necessarily drawn to scale. In the drawings.

Figure 1:
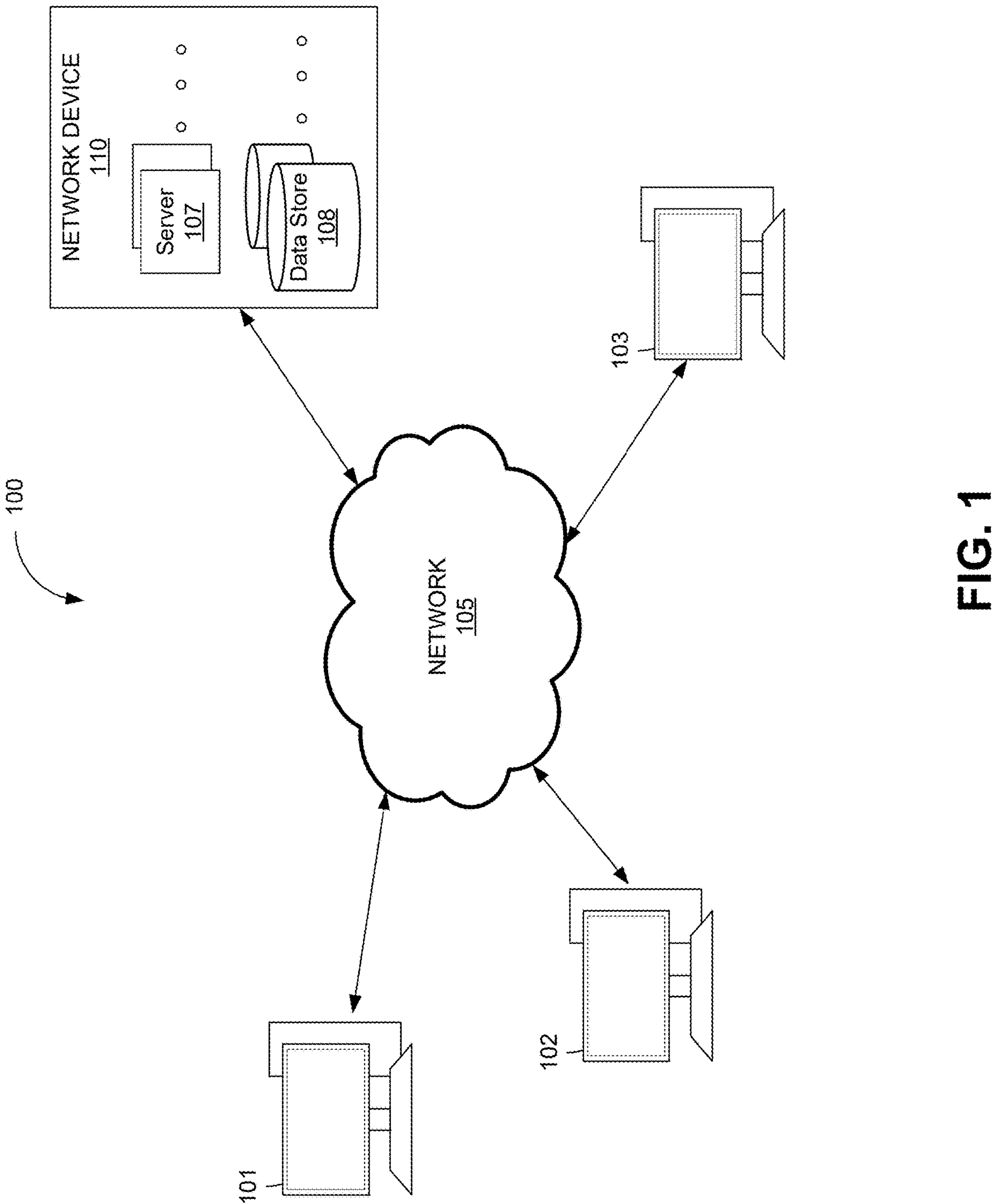
FIG. 1 illustrates an example system, in accordance with an example of the present disclosure.

The figures depict various examples for purposes of illustration only. One skilled in the art will readily recognize from the following discussion that alternative examples of the structures and methods illustrated herein may be employed without departing from the principles described herein.

DETAILED DESCRIPTION

Some examples of the present disclosure will now be described more fully hereinafter with reference to the accompanying drawings, in which some, but not all examples of the invention are shown. Indeed, various examples of the invention may be embodied in many different forms and should not be construed as limited to the examples set forth herein. Like reference numerals refer to like elements throughout. As used herein, the terms "data," "content," "information" and similar terms may be used interchangeably to refer to data capable of being transmitted, received or stored in accordance with examples of the invention. Moreover, the term "exemplary", as used herein, is not provided to convey any qualitative assessment, but instead merely to convey an illustration of an example. Thus, use of any such terms should not be taken to limit the spirit and scope of examples of the invention.

As referred to herein, the terms "sender," "sender side," "local side," and similar terms may be used interchangeably to refer to one or more devices, systems, nodes, or applications that may initiate the transfer of data to a remote destination (e.g., receiver side). The sender side may include servers, storage systems, applications, or network devices that transmit data over a network or internet connection. The sender side may include functions and methods for preparing and transmitting the data, ensuring its integrity and accuracy, and managing the communication protocol used for the transfer, including tasks such as data encoding, packetization, error detection and correction, and protocol-specific processing.

As referred to herein, the terms "receiver," "remote side," "receiver side," and similar terms may be used interchangeably to refer to one or more devices, systems, nodes, or applications that may receive data transmitted from a sender. This can include servers, storage systems, applications, or network devices that accept data over a network or internet connection. The receiver side may include functions and methods for processing and handling the incoming data, ensuring its integrity and accuracy, and managing the communication protocol used for the transfer of data.

Large-scale data centers are the backbone of modern computing, supporting a vast array of applications and services that drive global communication, commerce, and innovation. These massive facilities are used by tech giants, cloud providers, enterprises, or the like to store, process, and distribute enormous amounts of data, enabling cloud computing, social media, e-commerce, online search, and big data analytics.

As data center technology is rapidly evolving, with advancements in areas such as artificial intelligence, machine learning, and the Internet of Things (IoT) driving demand for more powerful, efficient, and sustainable data centers. In some examples, data centers may experience delays in data transfer due to a combination of increased number of data packets being transferred, congestion of the data packet transfer, loss of packets during data transfer, and out of order data packet transmission. As a result, as the influx of data increases there may be an increase in round trip time (RTT) associated with the transmission of data.

Delays in large-scale data centers can occur when there is an increase in round-trip time (RTT), which is the time it takes for a data packet to travel from the sender to the receiver and back. As data centers grow in size and complexity, the distance between servers and switches increases, leading to longer cable lengths and higher latency. This increased RTT can cause delays in data transmission, processing, and storage, ultimately affecting the overall performance of the data center. For example, in a distributed database, an increase in RTT can slow down data replication and synchronization, leading to delays in data availability and consistency. Similarly, in cloud computing environments, higher RTT can result in slower response times for user requests, impacting application performance and user experience. Furthermore, increased RTT can also amplify the effects of network congestion, packet loss, and errors, making it challenging to maintain high availability and reliability in large-scale data centers.

These drawbacks may be more apparent in AI training clusters, as the size of the workloads and data are growing exponentially as technology advances. Conversely, machine learning model complexity and thread are also growing, which may require large training clusters of AI training accelerators, where the accelerators may communicate with each other to facilitate the exchange of training data/results. For example, AI training clusters may be built using high performance accelerators communicating with each other via a high throughput/low latency back-end network. However, due to the sheer size of the data packets being transmitted data paths associated with the transfer from one component to the next may be imbalanced.

Data paths may be imbalanced due to the volume or number of data packets being transmitted with an AI training cluster, for example, the data being transmitted may exceed the capacity of one or more components in the data path, leading to congestion and reduced performance. Imbalanced data paths may occur, for example, when a single node or a small group of nodes is handling a disproportionate amount of data, causing a bottleneck in the network. For example, in a AI training cluster with multiple general processing units (GPUs), if one GPU is processing a large model while others are idle, the data path to that GPU may become overwhelmed, leading to slower data transfer rates and increased latency. Similarly, if a single storage node is handling all the data storage and retrieval requests, the storage node may become a bottleneck, slowing down the entire AI training cluster. Additionally, imbalances can also occur due to uneven traffic distribution, packet retransmissions, or network errors, further exacerbating the issue. As a result, the entire AI training cluster's performance may be impacted, leading to longer training times and reduced productivity. To mitigate this, data center architects and engineers employ various methods, such as load balancing, traffic dispersal, and network optimization, to ensure that data paths are balanced and may handle the massive amounts of data required for large-scale AI workloads. However, many of these methods may not be sufficient for large-scale data centers, such as data centers associated with AI training clusters.

In small-scale data centers, traffic dispersal may distribute data traffic across multiple data paths simultaneously. Distributing data traffic in this manner may enable an data center to increase the overall throughput and reduce the completion time of AI training workloads, which may often require massive amounts of data to be processed in parallel. By spraying (e.g., transmitting) data traffic across multiple paths, the data center can ensure that no single path becomes overwhelmed, thereby minimizing latency, packet loss, and other performance issues that can impact AI training times. Additionally, this approach may improve fault tolerance and reliability, as traffic can be rerouted around failed or congested paths, ensuring continuous operation and minimizing downtime. However, as the size of the data center may increase, the method of traffic dispersal may increase latency.

While traffic dispersal may improve performance in small-scale data centers, there may be unintended consequences in larger-scale data centers, such as many AI training clusters. In large-scale data center environments, dispersing traffic across multiple paths may lead to increased latency and reduced performance due to the complexity of routing and switching. As the number of paths and network devices increase, the overhead of routing and switching may grow exponentially, leading to increased packet processing times and reduced throughput. Additionally, the increased complexity of traffic dispersal can lead to higher error rates, packet loss, out of order completion requests, and retransmissions, which may significantly impact the completion time of AI training workloads. Additionally, the sheer scale of larger data centers may result in increased hop counts, leading to longer packet traversal times and reduced performance. In some examples, the benefits of traffic dispersal can be outweighed by the increased overhead, leading to increased completion times for AI training workloads.

Although traffic dispersal may effectively reduce latency in small-scale data centers, traffic dispersal may be insufficient for large-scale data centers which may result in increased error rates, packet loss, out of order completion requests, and retransmissions. As such, there may be a need for a more efficient and flexible method to track and maintain order of completion associated with data transmission in large-scale data centers. In an example, a method may track completion of all outstanding requests from the originating node to all nodes (e.g., from a source to a destination node pair, sender to receiver, initiator to target, or the like). In an example, a plurality of data packets may be sent simultaneously between one or more data paths associated with one or more network devices, where one or more data packets of the plurality of data packets may comprise a message. One or more messages of the plurality of messages, associated with a request, may be assigned a message sequence number (MSN) that may be unique within a queue pair (QP). Each message may be assigned a global sequence number (GSN) to monitor the completion of requests. By assigning MSNs to one or more messages associated with a QP (e.g., one or more portions of a message) and GSNs to the one or more messages the method may effectively track one or messages (e.g., a plurality of data packets) as they are transmitted from a source to a destination and maintain an order associated with the messages to be transmitted.

FIG. 1 illustrates an example system 100 according to example aspects of the present disclosure. The system 100 may be capable of facilitating the transmission of data among routers, switches, gateways, servers, users, servers, databases, nodes, or any combination thereof. The system 100 may include one or more devices 101, 102, 103 (also may be referred to herein as nodes 101, 102, 103), server 107, data store 108, or network device 110. In some examples, devices 101, 102, and 103 may be examples of user equipment (UE) (e.g., UE 30 of FIG. 6). As shown for simplicity, network device 110 may comprise one or more servers (e.g., server 107) and one or more data stores (e.g., data store 108). In some examples, the network device 110 may be a computer system (e.g., computer system 500 of FIG. 6) capable of delivering internet based content or other content to users over a network 105 (e.g., the internet) via a web browser. In some examples, it is contemplated that the network device 110 may be a standalone device. In other examples, the network device may be located on a server. It is contemplated that network device 110 may interact and/or communicate with one or more devices (e.g., devices 101, 102, 103) of system 100.

In some examples, device 101, device 102 and device 103 may be associated with an individual (e.g., a user), entity (e.g., organization), node (e.g., accelerometer), or the like that may interact or communicate with data server(s) associated with network device 110. The network device 110 may be considered, or associated with, an application(s), a messaging platform(s), a social media platform(s), a website(s), or the like. In some examples, one or more users may use one or more devices (e.g., node 101, node 102, node 103) to access, send data to, and/or receive data from network device 110. In some examples, one or more entities may use one or more devices (e.g., device 101, device 102, device 103) to access, send data to, and/or receive data from network device 110.

This disclosure contemplates any suitable network 105. As an example and not by way of limitation, one or more portions of network 105 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. In some examples, network 105 may include one or more networks 105. In particular examples, one or more network 105 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular examples, one or more links may each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links.

The devices 101, 102 and 103 may be an electronic device including hardware, software, or embedded logic components or a combination of two or more such components and capable of carrying out the appropriate functionalities implemented or supported by the devices 101, 102, 103. As an example and not by way of limitation, devices 101, 102, 103 may be a computer system such as for example, a desktop computer, notebook or laptop computer, netbook, a tablet computer (e.g., smart tablet), e-book reader, global positioning system (GPS) device, personal digital assistant (PDA), handheld electronic device, cellular telephone, smartphone, augmented/virtual reality device, other suitable electronic device, or any suitable combination thereof. This disclosure contemplates any suitable device(s) (e.g., devices 101, 102, 103). One or more of the devices 101, 102, 103 may enable a user to access network 105. One or more of the devices 101, 102, 103 may enable a user(s) to communicate with other users at other devices 101, 102, 103.

In particular examples, system 100 may include one or more servers 107. Each of the servers 107 may be a unitary server or a distributed server spanning multiple computers or multiple datacenters. Servers 107 may be of various types, such as, for example and without limitation, web server, news server, mail server, message server, advertising server, file server, application server, exchange server, database server, proxy server, another server suitable for performing functions or processes described herein, or any combination thereof. In particular examples, each of the servers 107 may include hardware, software, or embedded logic components or a combination of two or more such components for carrying out the appropriate functionalities implemented or supported by server 107.

In particular examples, system 100 may include one or more data stores 108. Data stores 108 may be used to store various types of information. In particular examples, the information stored in data stores 108 may be organized according to specific data structures. In particular examples, each of the data stores 108 may be a relational, columnar, correlation, or other suitable database. Although this disclosure describes or illustrates particular types of databases, this disclosure contemplates any suitable types of databases. Particular examples may provide interfaces that enable devices 101, 102, 103 or another system (e.g., a third-party system) to manage, retrieve, modify, add, or delete, the information stored in data store 108.

In some examples, network device 110 may be a network-addressable computing system that may host an online search network. The network device 110 may store, receive, process, or analyze data. In examples, network device 110 may facilitate data interactions between clients (e.g., users), databases, and entities (e.g., organizations). In an example, the network device 110 may retrieve data from databases (e.g., data store 108) and execute data mining processes or methods to extract information associated with the data. The network device 110 may be configured to handle a vast volume of data generated from a number of sources such as but not limited to web pages, social media platforms, or the like. The network device 110 may be configured to retrieve, process, or analyze data based on a request, where in response the network device 110 may retrieve relevant data from databases (e.g., data store 108), servers (e.g., server 107), or any other device of system 100. In some examples, network device 110 may be configured to perform methods or processes associated with data mining to generate a result associated with the request received.

Although FIG. 1 illustrates a particular arrangement of device 101, device 102, device 103, network 105, server 107, data store 108, and/or network device 110, among other things, this disclosure contemplates any suitable arrangement. The devices of system 100 may be physically or logically co-located with each other in whole or in part. It should be pointed out that although FIG. 1 shows one network device 110, server 107, data store 108 and three devices 101, 102, and 103, any suitable number of network devices 110, devices 101, 102, 103, servers 107, and data stores 108 may be part of the system 100 of FIG. 1 without departing from the spirit and scope of the present disclosure.

Figure 2A:
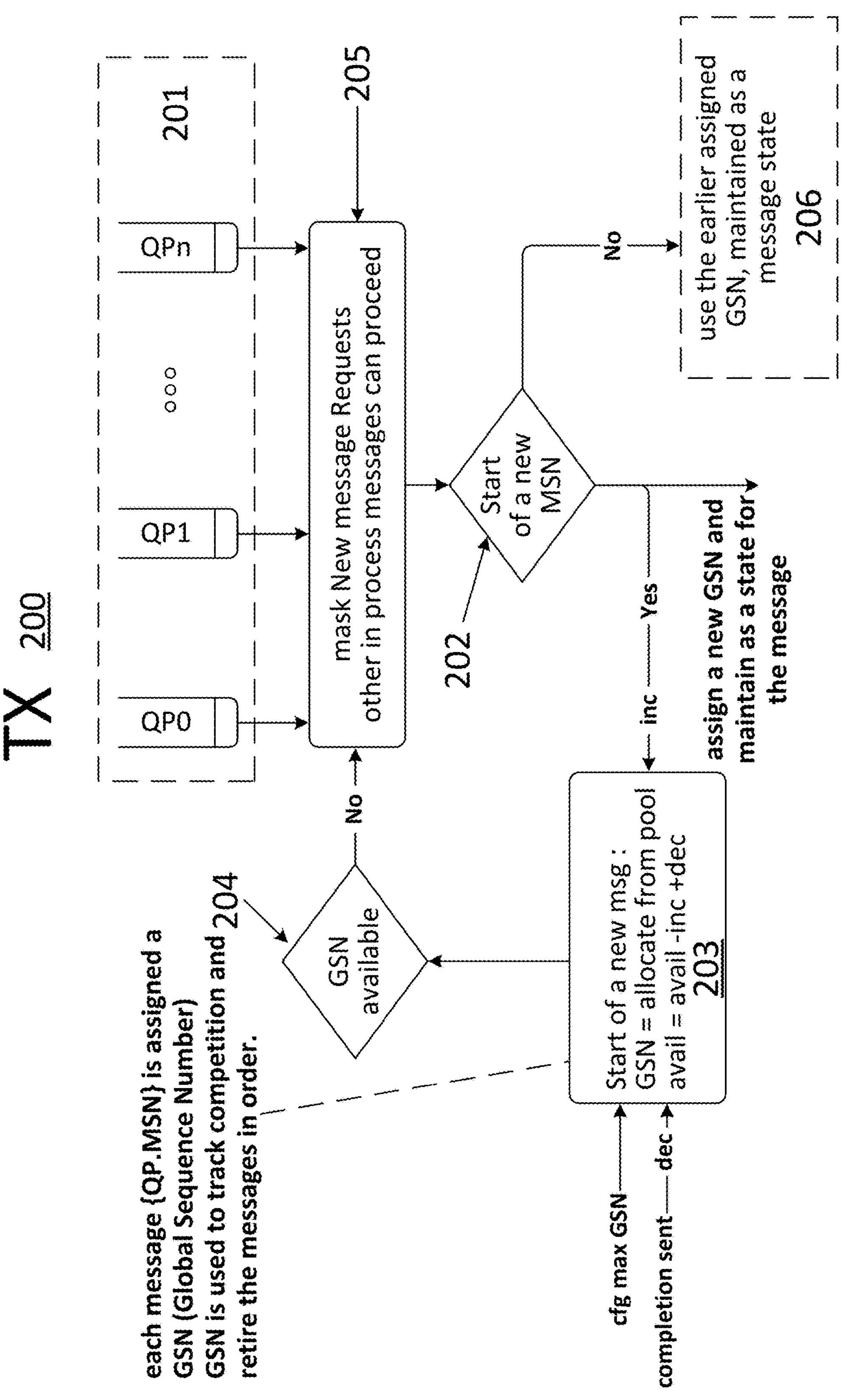
FIG. 2A illustrates an example method, in accordance with an example of the present disclosure.

FIG. 2A illustrates an example method of transmit (TX) 200, in accordance with an example of the present disclosure. The method of TX 200 may originate at a sender which may be a source node, first network device, a transmitter, an initiator, or the like. The sender may be configured to send packets (e.g., one or more portions of a message) from the source device to a destination device (e.g., destination node) through the network (e.g., network 105), ensuring efficient and reliable data transfer. In some examples, the sender may perform functions such as, but not limited to, data encoding, packetization, header addition, preparing the data for transmission, or the like, or any combination thereof. In some examples, the transmitter may send one or more data packets associated with a message through a network medium, such as fiber optic cables, copper wires, or the like using signal transmission techniques.

The sender may break down a message into one or more data packets, that may define or be associated with queue pairs (QPs) to manage transmission of packets. The one or more messages may be divided into a plurality of data packets to facilitate efficient and reliable transmission of data over a network (e.g., network 105). A message may be divided into one or more data packets in a process called packetization. By dividing the message into one or more data packets, one of the one or more data packets may be transmitted independently, reducing the impact of network errors or network congestion that may be associated with transmitting the size or entirety of the message. Packetization may also enable the transmitter to use parallel processing and multiplexing, where one or more packets may be transmitted simultaneously over different data paths, which may increase overall throughput. The one or more data packets of the plurality of data packets may be of any suitable size (e.g., bit, byte, kilobyte, megabyte, etc.) smaller than that of the message, for example, the message may be 16 kilobytes and may be divided into four data packets each comprising 4 kilobytes of data. As such, the smaller size of the one or more data packets may be transmitted in shorter time interval which may allow for efficient utilization of network bandwidth. As a result, latency may be reduced, and network performance may be increased in comparison to sending the message as a whole.

After a message is divided into one or more data packets, the sender may define queue pairs (QPs) to manage the transmission of the one or more data packets from one network device (e.g., node, server or the like) to another network device. The message may comprise any number of data packets as defined by the size of the message and the bandwidth of the network 105. The data packets associated with the message may be any suitable size (e.g., bytes, kilobytes (KB), megabyte (MB), or the like) supported by the network 105. In some examples, the data packets may be of the same size or of variable size (e.g., one or more of the data packets may be smaller or larger than the other data packets). It is to be understood that a QP (e.g., QP0, QP1, or QP2) may facilitate the transmission of a plurality data packets associated with one or messages (e.g., a QP may facilitate the transmission of one or more messages from a sender to a receiver).

The method of TX 200 may begin at block 201 At block 201, The sender may assign a QP (e.g., QP0, QP1, QPn) to one or more messages, based on its destination, priority, or any other suitable factors. A QP may comprise of two queues, such as a send queue (SQ) and a receive queue (RQ) which may be paired together to form a single, logical communication channel. The sender may define a QP by assigning a QP number (e.g., QP0, QP1, QPn) to each QP, which may enable the sender to identify and manage one or more QPs simultaneously. In some examples, the QP may be utilized to determine an optimal data path, packet sequence or the like. The QP number may be used to route a plurality of data packets, associated with one or more messages, to a corresponding queue (e.g., a correct queue), ensuring that data is transmitted and received at the corresponding node(s) (e.g., the correct node).

At block 202, a message sequence number (MSN) may be assigned (e.g., created or generated) for one or more messages at one or more QPs associated with the sender (e.g., initiator). For example, a first QP (e.g., QP0) of the one or more QPs (e.g., QP0, QP1, QPn) may be associated with one or more messages. One of the one or more messages may be assigned a MSN. For example, a first message of the one or more messages may be assigned MSN 1, a second message of the one or more messages may be assigned MSN 2, and a third message of the one or more messages may be assigned MSN 3. In an example, one of the one or more messages may be packetized, via packetization, such that the one or more messages may be divided into a plurality of data packets for transmission to a receiver (e.g., target). One of the one or more messages (e.g., a message) may comprise one or more data packets. In an example, the one or more data packets associated with a packet may be assigned a packet sequence number (PSN), where each of the one or more data packets associated with the message may be assigned a PSN incrementally. For example, a message may be packetized into four data packets, as such the first data packet may be assigned PSN 1, the second data packet may be assigned PSN 2, and so forth. The one or more data packets associated with a message may be assigned the same MSN, for example, one or more data packets associated with the first message may be associate with MSN 1.

At block 203, a global sequence number (GSN) may be assigned to one of the one or more messages associated with a QP of the plurality of QPs. In an example, one of the one or more messages (e.g., each message) may be assigned a GSN. The GSN may be used to track completion and retire messages in order of request. GSN's may be assigned at the start of a new message, for example, if one or more data packets are received associated with a first message assigned MSN 1, the GSN may be utilized for the totality of the message (e.g., one or more data packets) until one or more data packets of a second message assigned MSN 2 may be received. In such examples, the method may proceed to block 206 until another message is received.

Further at block 203, a GSN may be assigned based on a bitmap of available GSNs. As such, the GSN assigned to a message of a plurality of messages may not be repeated to maintain the order of the message being transmitted. The bitmap of GSNs may be a data structure used to count, track, and manage GSNs. The bitmap may be a compact representation of a range of GSNs, where each bit corresponds to a specific GSN. In an example, the bitmap may be configured to prevent the reuse of GSNs by maintaining a record of assigned GSNs. In such examples, a bitmap with a fixed size may be created, representing a range of possible GSNs, with all bits set to 0, indicating no GSNs have been assigned. When assigning a new GSN to a message, the corresponding bit in the bitmap may be checked. For example, if the bit is 0, the bit may be set to 1 to indicate that the GSN is assigned. Conversely, if the bit is already set to 1, the GSN has already been assigned to a message and cannot be reused. This may prevent duplicative GSN assignments to messages to be sent via the sender to a receiver. For example, and by no way of limitation, a bitmap representing a number of GSNs ranging to a maximum message bandwidth of the system (e.g., system 100) all bits may be initially set to zeros. When assigning a GSN, such as GSN 9, the corresponding bit is set to 1. Attempting to reuse GSN 9 may trigger a bitmap check, revealing the bit is already 1, thus preventing reuse. It is contemplated that the bitmap of GSNs may be assigned in any suitable order. It is contemplated that the bitmap of GSNs may be a global resource for the one or more QPs, for example, the same bitmap of GSNs may be utilized for each QP associated with a sender (e.g., initiator). For example, a first GSN assigned to a first message associated with QP1 is in use, therefore, a second GSN assigned to a second message associated with QP2 may not be the same GSN as the first GSN.

At block 204, the GSN may be assigned at the time of queue selection (e.g., assignment of one or more messages to a QP) and scheduling. To assign the GSN, the method of TX 200 may first reference a bitmap of GSNs, or a database (e.g., data store 108) of GSNs to determine an available GSN to allocate (e.g., assign) to a new message. One or more QPs associated with one or more messages may maintain state if they are at the start, middle, or end of a message. In an example, if a QP (e.g., QP1) is at the start of a new message (e.g., a fifth message of the plurality of messages) and GSNs are not available, the new message may be masked and may not be consider for the arbitration and selection process as illustrated with block 205. Other messages or other messages associated with other QPs (e.g., QP0, QPn), where a GSN may already be allocated, that may be in the middle or end of a message may continue to be arbitrated and scheduled. In some examples, the GSNs associated with a message of the plurality of messages may be stored in a database (e.g., data store 108) along with in path attributes such as but not limited to MSN, PSN, frame sequence number (FSN), or any combination thereof. Although the GSN may be stored with in path attributes, it is contemplated that the GSN may be not be transmitted in path to any other device or device of the system, however, MSN, PSN, or FSN may be transmitted in path from a sender to a receiver.

In some examples, PSN may be a unique identifier assigned to each data packet, a message, transmitted over the network 105. For example, a PSN may be assigned to each data packet associated with a message that may be assigned a MSN. As such, a first message assigned MSN 1 may comprise a one or more data packets, wherein each data packet may be assigned a PSN incrementally for the number of data packets associated with the message. The PSN may be utilized to ensure that one or more data packets are delivered in the correct order. The PSN may also be configured to aid in the detection of lost, duplicated, or corrupted data packets. In some examples, the FSN may be an initial PSN assigned to the first packet (e.g., QP0) of a message. The FSN may be a unique identifier assigned to each data packet transmitted over the network 105. For example, a FSN may be assigned to each data packet, associated with a message, based on a virtual path associated with the network. For example, a first data packet associated with a first virtual path may be assigned FSN 1, and a second data packet associated with a second data path may be assigned FSN 2. In some examples, the FSN assigned may increment linearly in the virtual path associated with the transmission of data packets of a message. The FSN may be utilized to track the order of the data packets transmitted, detect errors, and detect duplicates. The FSN may also be configured to correct data packet order, detect data packet loss, and identify missing, duplicate, or corrupted data packets. When a message is divided down to one or more data packets, the FSN may be used to identify the starting point of the packet sequence, while subsequent packets are assigned incrementing PSNs. By using PSNs, FSNs, and MSNs, network devices may efficiently manage packet transmission, message order, and detect data packet transmission errors ensuring reliable data transfer in high-speed networks like data centers. Network devices may be able to efficiently reassemble messages associated with the data packets by using PSNs and MSNs.

Figure 2B:
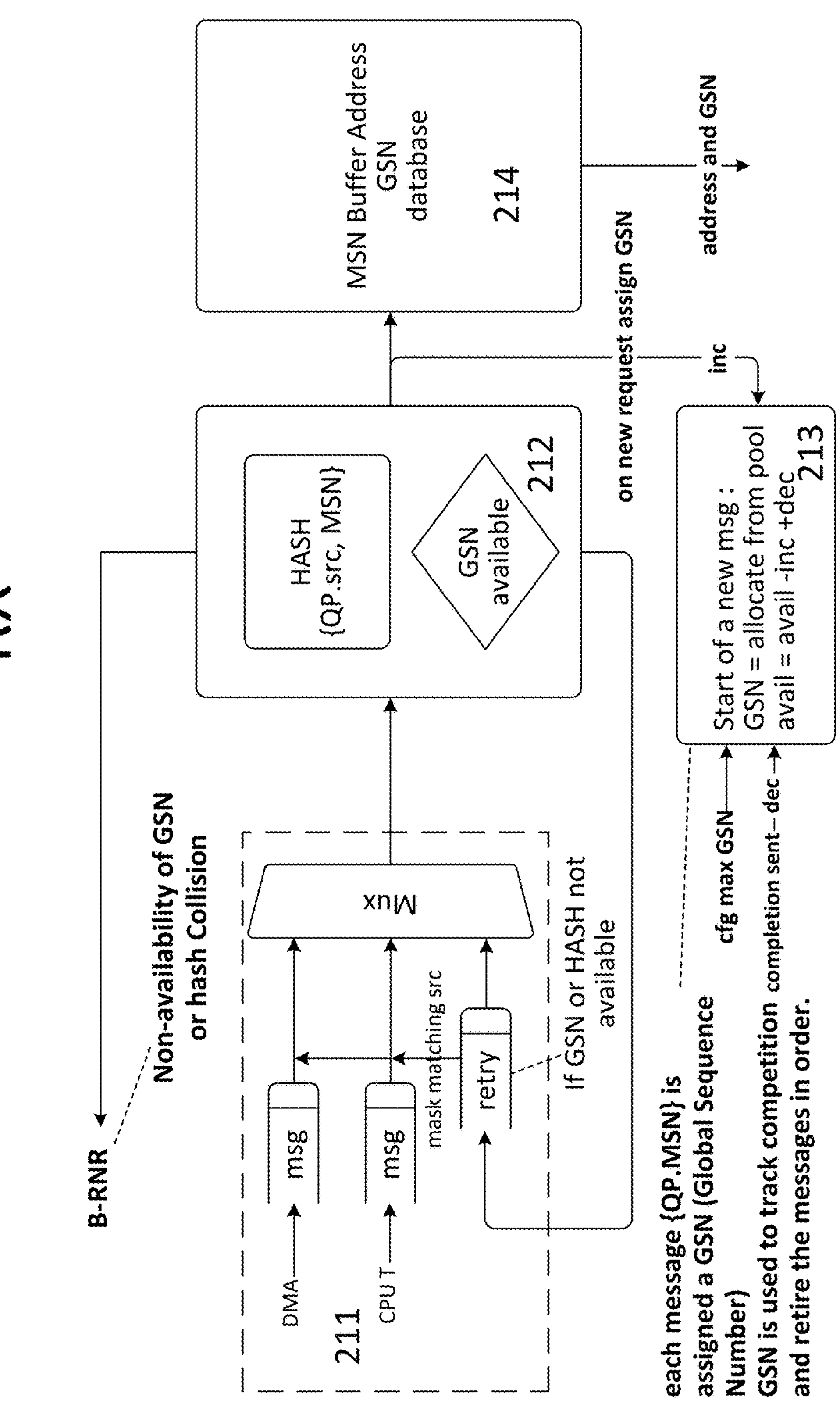
FIG. 2B illustrates an example method, in accordance with an example of the present disclosure.

Now in reference to FIG. 2B illustrating a method of receive (RX) 210, in accordance with an example of the present disclosure. The method of RX 210 may originate at a receiver which may be a destination node, a network device, a remote device, or the like. The receiver may be configured to receive data packets (e.g., one or more portions of a message) from a sender (e.g., source device) through a network (e.g., network 105), ensuring reliable, efficient, and secure data transfer. In some examples, the receiver may perform functions such as, but not limited to, data decoding, packet reassembly, error detection and correction, protocol-specific processing, or the like, or any combination thereof. In some examples, the receiver may receive one or more data packets associated with a message through a network medium, such as fiber optic cables, copper wires, or the like using signal transmission 0000000echniques.]

At block 211, the receiver may receive a plurality of messages, associated with one or more QPs, sent or transmitted from a sender as described in FIG. 2A. The receiver may be configured to receive a plurality of data packets and reassemble the plurality of data packets to ensure accurate and efficient message reassembly. The reassembled plurality of data packets may be associated with the plurality of messages. In some examples, as multiple messages are transmitted concurrently, the receiver side may employ techniques to recombine one or more data packets into a message. The one or more data packets received may be processed by a multiplexer (Mux). Mux may be configured to direct one or more data packets to their corresponding receive queues, where they may be buffered and managed.

Further at block 211, as one or more messages of the plurality of messages are received, each message may be assigned a GSN, also referred to herein as a receiver GSN. The receiver GSN may be assigned in a manner similar to what is described at block 204 of the FIG. 2A. To assign the receiver GSN, the method of RX 210 may first reference a bitmap of receiver GSNs, or a database (e.g., data store 108) of receiver GSNs to determine an available GSN to allocate (e.g., assign) to a new message received. One or more data packets associated with one or more messages may maintain state if they are at the start, middle, or end of a message. In an example, if a data packet (e.g., PSN 1) is at the start of a new message (e.g., a fifth message of the plurality of messages) and GSNs are not available, the new message received may be masked (e.g., restart the method of RX 210). Other messages, where a receiver GSN may already be allocated, that may be in the middle or end of a message may continue to be arbitrated and scheduled. In some examples, the receiver GSNs associated with a message of the plurality of messages may be stored in a database (e.g., data store 108) along with in path attributes such as, but not limited to, MSN, PSN, FSN, or any combination thereof. Although the GSN may be stored with in path attributes, it is contemplated that the GSN may be not be transmitted in path to any other device or device of the system, however, MSN, PSN, or FSN may be received and or associated with the information (e.g., data packets) received from a sender (e.g., initiator) in path from a sender to the receiver.

At block 212, the receiver may utilize a hash function (HASH) based on a fast loop database to assign a HASH entry to one or more messages of the plurality of messages received. In some examples, the HASH entry and the GSN (e.g., receiver GSN) may be allocated simultaneously, in parallel, or in concert. In some examples, HASH may be a process configured to index data, retrieve data, verify data integrity, and comparison and matching of data. HASH may be utilized for load balancing, which may distribute data packet traffic across one or more servers, data caching, which may store and retrieve frequently accessed data and data packet routing. Data packet routing may direct one or more data packets to their intended destinations. However, in some examples, HASH may encounter hash collisions. Hash collisions may occur when two distinct data packets may produce the same hash value. Hash collisions may lead to data corruption or loss, incorrect routing or forwarding, or the like.

In further reference to block 212, in some examples, resources may not be available due to HASH collision or non-availability of a GSN, as referenced with block 211. In such examples, the method of RX 210 may proceed to a process called Buffer Resource Not Ready (B-RNR). In some examples, B-RNR may be a data structure or protocol mechanism used in various networking or distributed systems to manage when the receiver may be ready to receive messages. In an example, when a receiver is not ready to accept incoming data (e.g., a plurality of data packets associated with a plurality of messages), the receiver (e.g., target) may send a B-RNR negative acknowledgement (NACK) packet to the sender (e.g., initiator). The B-RNR NACK packet may indicate to the sender that the receivers buffers resources are not available to receive the data, which may be indicative of non-availability of receiver GSNs or HASH. As such, in an example, the sender (e.g., initiator) may retry the transmission (e.g., transfer) of data. In further reference to block 212, when a GSN or HASH are not available, the method of RX 210 may perform the processes associated with block 211 and restart the method of RX 210.

At block 213, a GSN may be assigned to a new message received at the receiver. In an example, each message {QP.src, MSN} may be assigned a GSN (e.g., receiver GSN), which may be used to in coordination with received MSNs to track completion and retire messages in order of request. In an example, the GSN may be assigned based on a bitmap of available GSNs, similar to block 204 associated with TX 200 and block 211. As such the GSN assigned to the message may not be repeated to maintain the order of the message being received. The bitmap of GSNs may be a data structure used to count, track, and manage GSNs. The bitmap may be a compact representation of a range of GSNs, where each bit corresponds to a specific GSN. In an example, the bitmap may be configured to prevent the reuse of GSNs by maintaining a record of assigned GSNs.

At block 214, GSN and buffer addresses may be stored in a database (e.g., data store 108) and HASH'ed using {QP.src, MSN}. This database 108 may be referenced for one of the plurality of messages received at block 211 upon arrival of a plurality of data packets associated with a message, where information such as QP, MSN, PSN, FSN, and address associativity. identified as QP, MSN for GSN and address associativity. Utilizing this database the receiver may utilize techniques to reassemble a message associated with the received plurality of data packets. Such techniques may include one or more of Selective ACK (SACK)-based reassembly, TCP/IP segment reassembly, InfiniBand packet reassembly, or the like to recombine one or more data packets into a message.

Figure 3A:
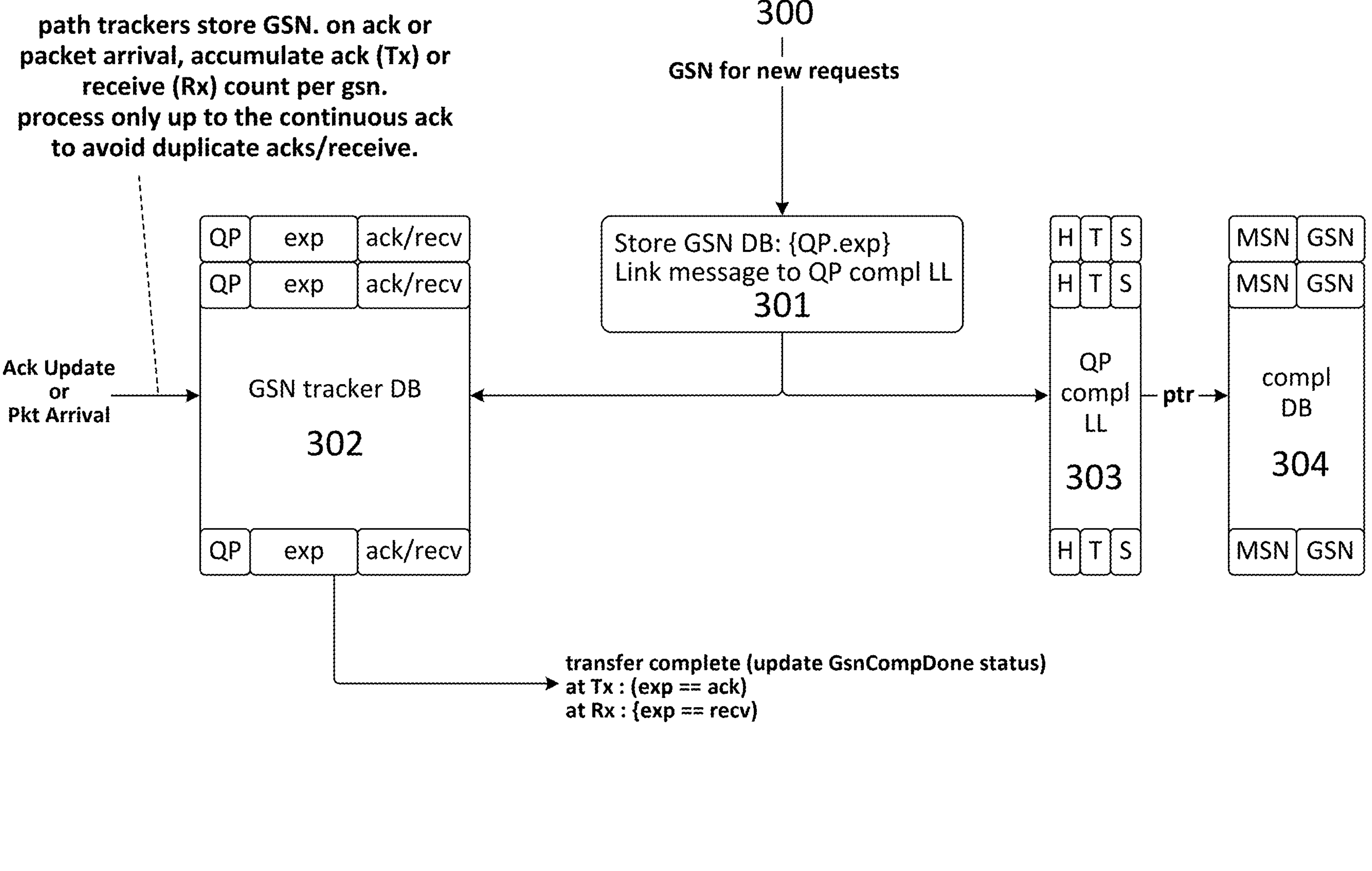
FIG. 3A illustrates an example method, in accordance with an example of the present disclosure.

FIG. 3A illustrates an example method 300, in accordance with an example of the present disclosure. At block 301, to track completion of a request, a database (e.g., data store 108) may be utilized to store the used GSNs. In some examples the sender and the receiver may have independent databases (e.g., bitmap of GSNs) to track the completion of requests. At block 302, the database 108 may store connections (e.g., QP.id) indicating an expected packet count and acknowledged (Tx) or received (RX) data packet count. In an example, as a result of scheduling a new message request, the database may be indexed with GSN and updated with connection (QP id), expected packet count (e.g., message size) and acknowledged/received packet count is set to zero. At block 303, in some examples, there may be another database (e.g., data store 108) that may be configured to maintain a linked list (LL) of requests per one of the one or more messages associated with one or more QPs in order of scheduling or posting of a request, wherein this structure may help avoid head of line blocking and send completions independently across one or more QPs order. At block 304, the order may be maintained with one or more messages. In an example, in response to a data packet or acknowledgement of arrival the sender (e.g., initiator) may count acknowledgment of data packet reception incrementally as per the new stat path and tracker. Conversely, the receiver may count received data packets of a message and the associated MSN and GSN of the received message. In some examples, continuously acknowledged or received data packets associated with a message may be utilized to update the database. As such, duplications may be avoided thus limiting or eliminating retransmission of one or more data packets.

Figure 3B:
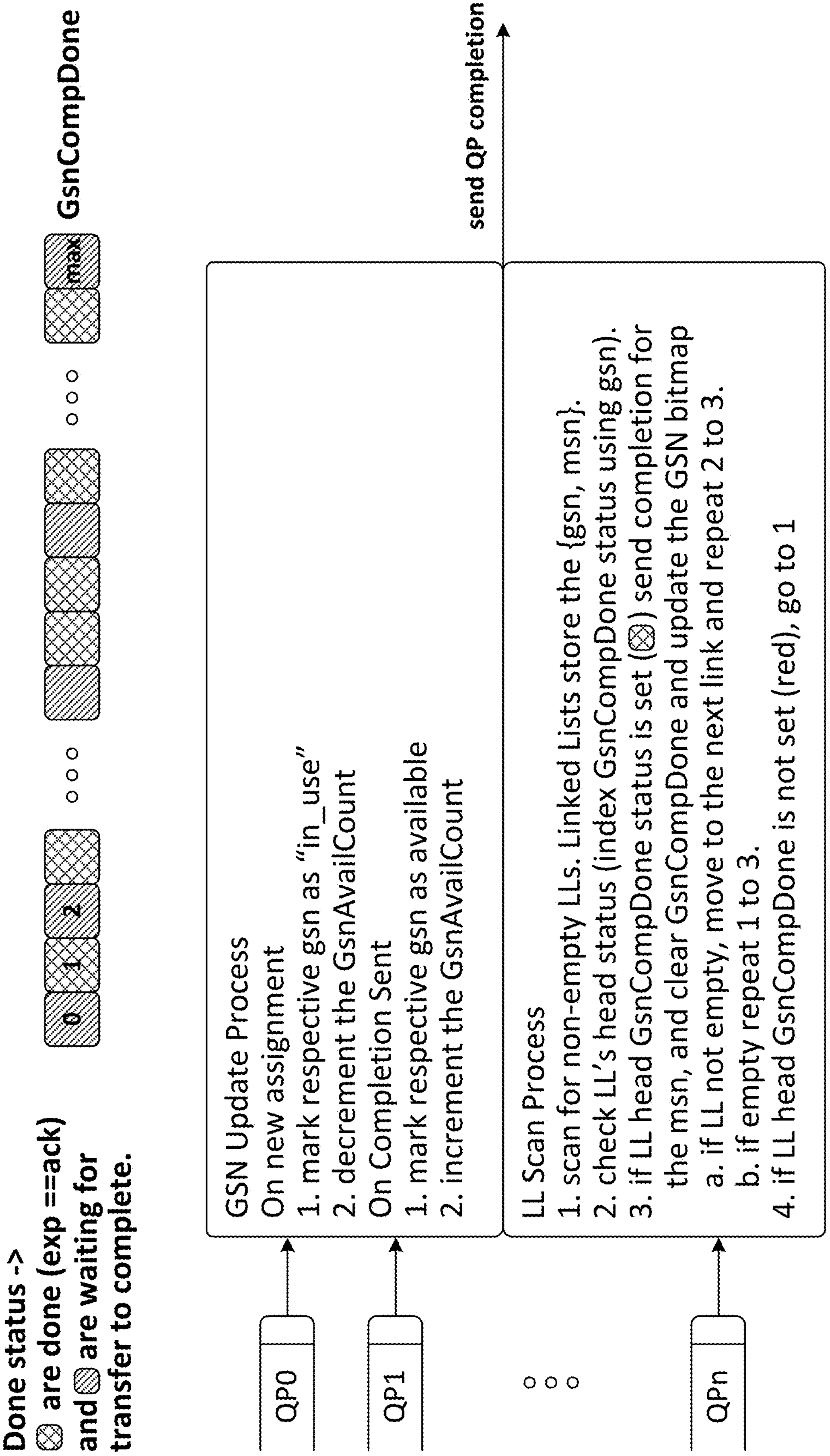
FIG. 3B illustrates an example method, in accordance with an example of the present disclosure.

In an example, to track transfer completion and that completion was sent, a bitmap GsnCompDone may be maintained. Available GSN's are also maintained as a bitmap. In some examples, the total available GSN's may be configurable. Once all GSN's are in use, B-RNR is asserted, and new requests may wait for available resources. GsnCompDone and GsnAvailStatus bitmap may be updated as illustrated in FIG. 3B. A linked list (LL) may be utilized to create MSN order, which may be in an increasing order. In some examples the number of expected data packets may be referenced against acknowledged or received data packers. In response to one or more packets being received by a receiver, an acknowledgement may be sent to the sender or transmitter. At the sender, the number of expected data packets may be compared to a sent packet count, which may refer to the one or more data packets sent or transmitted from a sender. The GSN allocated to one or more data packets (e.g., associated with a message) at the receiver, or the sender may be utilized for data packet tracking. The MSNs allocated at the sender may be utilized to create the LL, where the head of the LL may be checked. The LL may store the GSN and MSN associated with a message in a database 108. In some examples, GSN may be utilized to check the completion status via a GSNCompletionDone bitmap, wherein the GSNs linked in the LL may be retired in the order determined by the GSN allocated to the one or more data packets. In some examples, one or more messages may be completed out of order and have a GSNCompletionDone bitmap set, however the one or more messages may return to a pool such that the messages may be received or recombined in order of the GSN. The order of the GSN may be illustrated or determined by the LL to protect the order of completion associated with the one or more messages.

Figure 4:
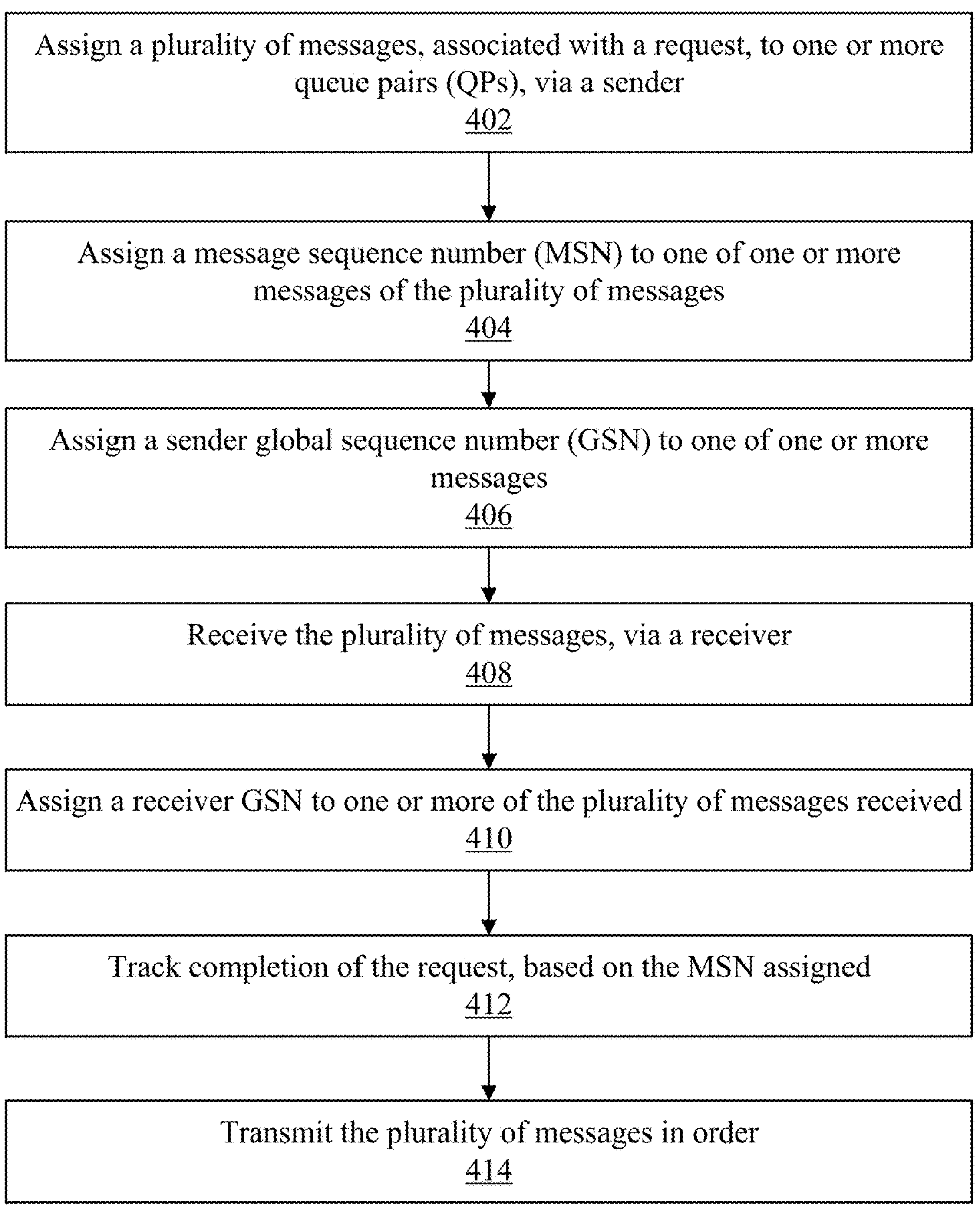
FIG. 4 illustrates an example method, in accordance with an example of the present disclosure.

FIG. 4 is a flowchart of an example process 400. In some implementations, one or more process blocks of FIG. 4 may be performed by a device 101, 102, 103. At block 402, the process 400 may include assigning a plurality of messages, associated with a request, to one or more QPs (e.g., QP0, QP1, QPN), via a sender. The plurality of messages may be packetized into a plurality of data packets for ease of transmission between data paths of the system (e.g., system 100). For example, device 101 may assign a plurality of messages to one or more QPS (e.g., QP0, QP1, QPN), via a sender, wherein the plurality of messages are associated with a request. The block 402, may further comprise dividing the plurality of messages to a QP, for example, one or more messages may be assigned (e.g., divided) to a QP. For example, device 101 may assign five messages of the plurality of messages to QP1. At block 404, a message sequence number (MSN) may be assigned to one of the one or more or more messages of the plurality of messages. The one or more messages may be associated with a QP of the one or more QPs. For example, device 101 may assign a MSN to a one of the one or more messages associated with a QP (e.g., QP1). At block 406, a sender global sequence number (GSN) may be assigned to one of the one or more messages associated with a QP of the one or more QPs. For example, device 101 may assign a first sender GSN to a first message of the one or more messages. The sender GSN may be stored in a database (e.g., data store 108) such that the sender GSN may not be reused for one of the one or more messages assigned a sender GSN.

At block 408, a receiver (e.g., device 102, 103) may receive the plurality of messages transmitted via the sender (e.g., device 101). The plurality of messages may be reassembled from a plurality of data packets received. For example, device 102 may receive the plurality of data packets transmitted from the sender, via a receiver, the receiver may reassemble the plurality of data packets to produce the plurality of messages. At block 410, the process 400 may include assigning a receiver GSN to one or of the plurality of messages received, via a receiver. For example, device 102 may assign a receiver GSN to a first message of the plurality of messages received, via a receiver. The receiver GSN may be stored in a database (e.g., data store 108) such that the receiver GSN may not be reused for one of the one or more messages assigned a receiver GSN as a result of receiving a plurality of messages.

At block 412, based on the MSN assigned to one of the one or more messages, completion of the request may be tracked. Tracking completion of the request may comprise comparing a plurality of data packets received to a plurality of data packets sent. For example, device 102 may track completion of the request, based on the MSN, wherein the one or more messages assigned the MSN are assigned MSNs in incremental order. For example, one or more data packets received from the sender may not be received in order. As such, the MSN associated with the one or more messages (e.g., one or more data packets) may indicate an order associated with the one or more messages received. For example, a second message assigned MSN 2 of the one or more messages may be completed before a first message assigned MSN 1. As such, the completion of MSN 2 associated with the second message may not be relayed or transmitted to a platform prior to the completion of MSN 1 associated with the first message. The MSN assigned to the one or more messages may be stored in a database (e.g., database 108) and may be compared as one or more data packets associated with a message may be received. At block 414, the plurality of messages may be transmitted in order based on the MSN assigned to the one of the one or more messages of the plurality of messages associated with the request. For example, device 101 may transmit the message in order based on MSN number or value associated with the one or more messages received. As such, the one or more messages may be transmitted based on a sequential value associated with the MSN assigned to the one or more messages. The one or more messages may be transmitted in order, based on MSN, to an application, device, platform, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel, simultaneously, independently, or any other suitable manner.

Figure 5:
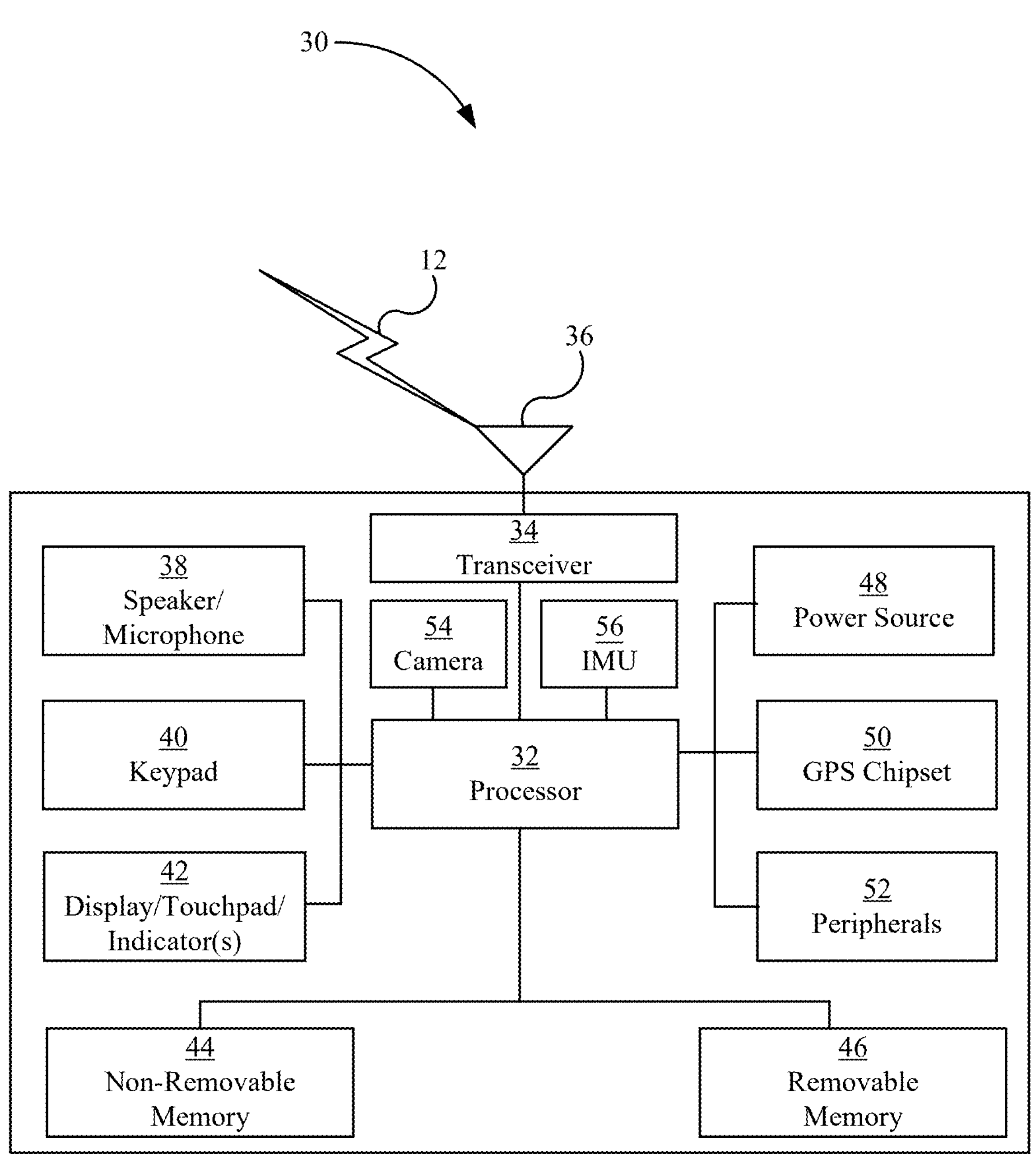
FIG. 5 illustrates an example computing device in accordance with an example of the present disclosure.

FIG. 5 illustrates a block diagram of an example hardware/software architecture of user equipment (UE) 30. As shown in FIG. 5, the UE 30 (also referred to herein as node 30) may include a processor 32, non-removable memory 44, removable memory 46, a speaker/microphone 38, a keypad 40, a display, touchpad, and/or indicators 42, a power source 48, a global positioning system (GPS) chipset 50, an inertial measurement unit (IMU) 56, and other peripherals 52. The UE 30 may also include a camera 54. In an example, the camera 54 is a smart camera configured to sense images appearing within one or more bounding boxes. The UE 30 may also include communication circuitry, such as a transceiver 34 and a transmit/receive element 36. It will be appreciated that the UE 30 may include any sub-combination of the foregoing elements while remaining consistent with an example.

The processor 32 may be a special purpose processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected.

The transmit/receive element 36 may be configured to transmit signals to, or receive signals from, other nodes or networking equipment. For example, in an example, the transmit/receive element 36 may be an antenna configured to transmit and/or receive radio frequency (RF) signals. The transmit/receive element 36 may support various networks and air interfaces, such as wireless local area network (WLAN), wireless personal area network (WPAN), cellular, and the like. In yet another example, the transmit/receive element 36 may be configured to transmit and receive both RF and light signals. It will be appreciated that the transmit/receive element 36 may be configured to transmit and/or receive any combination of wireless or wired signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple radio access technologies (RATs), such as universal terrestrial radio access (UTRA) and Institute of Electrical and Electronics Engineers (IEEE 802.11), for example.

The processor 32 may access information from, and store data in, any type of suitable memory, such as the non-removable memory 44 and/or the removable memory 46. For example, the processor 32 may store session context in its memory, as described above. The non-removable memory 44 may include RAM, ROM, a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the node 30, such as on a server or a home computer.

The processor 32 may receive power from the power source 48 and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the node 30. It will be appreciated that the node 30 may acquire location information by way of any suitable location-determination method while remaining consistent with an example.

Figure 6:
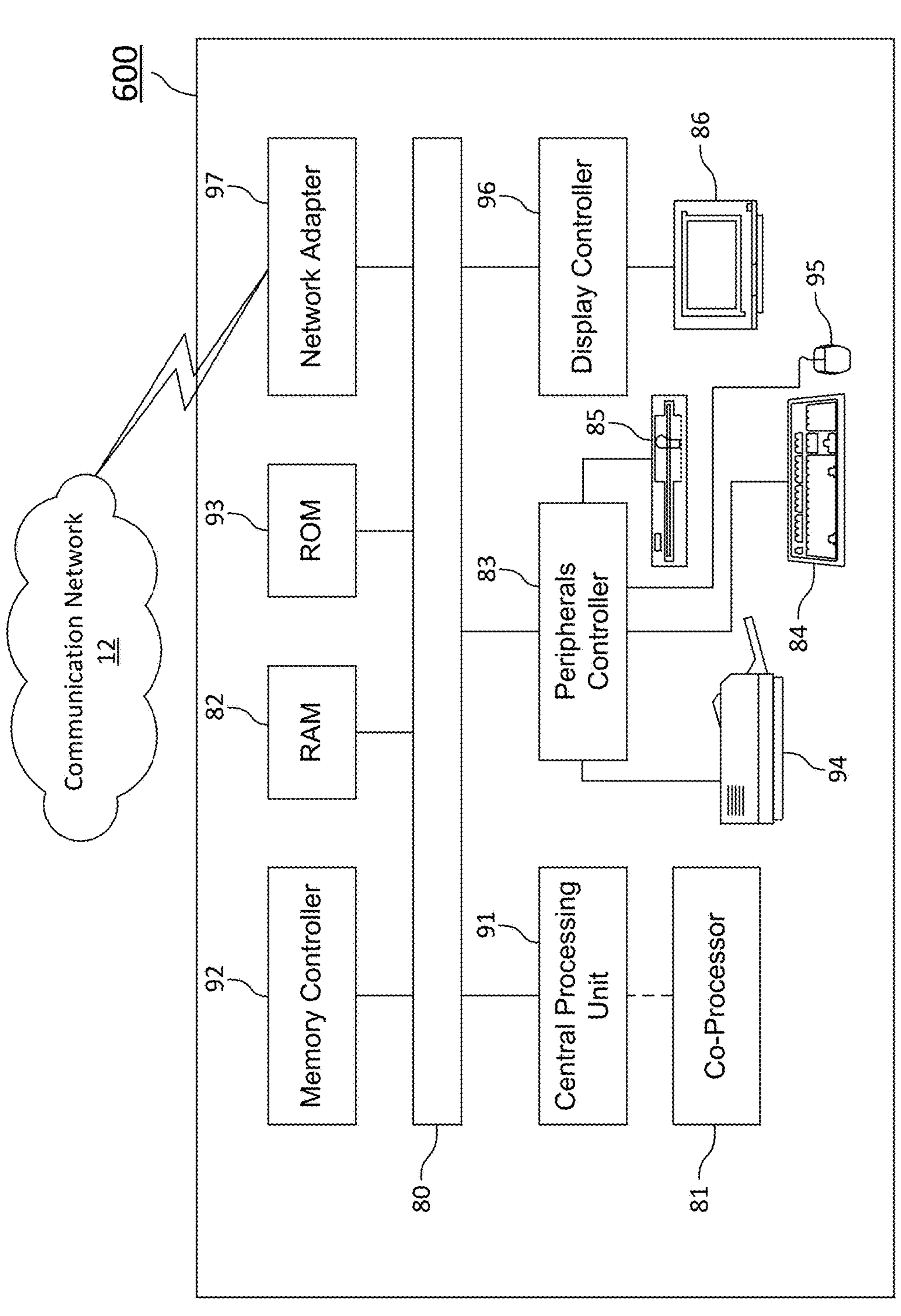
FIG. 6 is a diagram of an exemplary computing system in accordance with an example of the present disclosure.

FIG. 6 is a block diagram of an exemplary computing system 500. In some exemplary embodiments, the network device 110 may be a computing system 500. The computing system 500 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 300 to operate. In many workstations, servers, and personal computers, central processing unit 91 may be implemented by a single-chip CPU called a microprocessor. In other machines, the central processing unit 91 may comprise multiple processors. Coprocessor 81 may be an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 500 and defines the medium for data exchange. System bus 80 typically includes data lines for sending data, address lines for sending addresses, and control lines for sending interrupts and for operating the system bus. An example of such a system bus 80 is the Peripheral Component Interconnect (PCI) bus.

Memories coupled to system bus 80 include RAM 82 and ROM 93. Such memories may include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 500 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 500. Such visual output may include text, graphics, animated graphics, and video. Display 86 may be implemented with a cathode-ray tube (CRT)-based video display, a liquid-crystal display (LCD)-based flat-panel display, gas plasma-based flat-panel display, or a touch-panel. Display controller 96 includes electronic components required to generate a video signal that is sent to display 86.

Further, computing system 500 may contain communication circuitry, such as for example a network adaptor 97, that may be used to connect computing system 500 to an external communications network, such as network 12 of FIG. 5, to enable the computing system 500 to communicate with other nodes (e.g., UE 30) of the network.

It is to be appreciated that examples of the methods and apparatuses described herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features described in connection with any one or more examples are not intended to be excluded from a similar role in any other examples.

It is to be understood that the methods and systems described herein are not limited to specific methods, specific components, or to particular implementations. It is also to be understood that the terminology used herein is for the purpose of describing particular examples only and is not intended to be limiting.

Some portions of this description describe the embodiments in terms of applications and symbolic representations of operations on information. These application descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as components, without loss of generality. The described operations and their associated components may be embodied in software, firmware, hardware, or any combinations thereof.

Any of the steps, operations, or processes described herein may be performed or implemented with one or more hardware or software components, alone or in combination with other devices. In one embodiment, a software component is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

As used herein, the terms “data,” “content,” “information” and similar terms may be used interchangeably to refer to data capable of being transmitted, received and/or stored in accordance with examples of the disclosure. Moreover, the term “exemplary”, as used herein, is not provided to convey any qualitative assessment, but instead merely to convey an illustration of an example. Thus, use of any such terms should not be taken to limit the spirit and scope of examples of the disclosure.

As defined herein a “computer-readable storage medium,” which refers to a non-transitory, physical or tangible storage medium (e.g., volatile or non-volatile memory device), may be differentiated from a “computer-readable transmission medium,” which refers to an electromagnetic signal.

As referred to herein, an “application” may refer to a computer software package that may perform specific functions for users and/or, in some cases, for another application(s). An application(s) may utilize an operating system (OS) and other supporting programs to function. In some examples, an application(s) may request one or more services from, and communicate with, other entities via an application programming interface (API).

Herein, “or” is inclusive and not exclusive, unless expressly indicated otherwise or indicated otherwise by context. Therefore, herein, “A or B” means “A, B, or both,” unless expressly indicated otherwise or indicated otherwise by context. Moreover, “and” is both joint and several, unless expressly indicated otherwise or indicated otherwise by context. Therefore, herein, “A and B” means “A and B, jointly or severally,” unless expressly indicated otherwise or indicated otherwise by context.

The foregoing description of the examples has been presented for the purpose of illustration; it is not intended to be exhaustive or to limit the patent rights to the precise forms disclosed. Persons skilled in the relevant art can appreciate that many modifications and variations are possible in light of the disclosure.

The scope of this disclosure encompasses all changes, substitutions, variations, alterations, and modifications to the example examples described or illustrated herein that a person having ordinary skill in the art would comprehend. The scope of this disclosure is not limited to the example examples described or illustrated herein. Moreover, although this disclosure describes and illustrates respective examples herein as including particular components, elements, feature, functions, operations, or steps, any of these examples may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular examples as providing particular advantages, particular examples may provide none, some, or all of these advantages.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the examples is intended to be illustrative, but not limiting, of the scope of the patent rights, which is set forth in the following claims.

What is claimed:

1. A method comprising:

assigning a plurality of messages, associated with a request, to one or more queue pairs (QPs);

assigning a message sequence number (MSN) to one of a one or more messages of the plurality of messages;

assigning a sender global sequence number (GSN) to one of the one or more messages;

receiving the plurality of messages;

assigning a receiver GSN to the one or more messages of the plurality of messages received;

tracking completion of the request, based on the MSN assigned, via a sender; and transmitting the plurality of messages in order.

2. The method of claim 1, wherein the plurality of messages are packetized to a plurality of data packets to be transmitted between the sender to the receiver, and wherein the one or more messages are associated with a queue pair.

3. The method of claim 1, wherein the sender GSN is stored in a bitmap, wherein the bitmap maintains a record of sender GSNs assigned to prevent reuse of the sender GSNs.

4. The method of claim 1, wherein the receiver GSN is stored in a bitmap, wherein the bitmap maintains a record of receiver GSNs assigned to prevent reuse of the receiver GSNs.

5. The method of claim 3, wherein the bitmap associated with the sender GSN is local to the sender, wherein sender GSN is not sent to another device.

6. The method of claim 4, wherein the bitmap associated with the receiver GSN is local to the receiver, wherein the receiver GSN is not sent to another device.

7. The method of claim 1, wherein the sender GSN and the receiver GSN are assigned from separate bitmaps, wherein the size of the bitmap is dependent on optimal transfer of data between the sender and the receiver.

8. A device comprising:

one or more processors configured to:

assign a plurality of messages, associated with a request, to one or more queue pairs (QPs);

assign a message sequence number (MSN) to one of a one or more messages of the plurality of messages;

assign a sender global sequence number (GSN) to one of the one or more messages;

receive, via a receiver, the plurality of messages;

assign a receiver GSN to the one or more messages of the plurality of messages received;

track completion of the request, based on the MSN assigned, via a sender; and transmit the plurality of messages in order.

9. The device of claim 8, wherein the plurality of messages are packetized to a plurality of data packets to be transmitted between the sender to the receiver, and wherein the one or more messages are associated with a queue pair.

10. The device of claim 8, wherein the sender GSN is stored in a bitmap, wherein the bitmap maintains a record of sender GSNs assigned to prevent reuse of the sender GSNs.

11. The device of claim 8, wherein the receiver GSN is stored in a bitmap, wherein the bitmap maintains a record of receiver GSNs assigned to prevent reuse of the receiver GSNs.

12. The device of claim 10, wherein the bitmap associated with the sender GSN is local to the sender, wherein sender GSN is not sent to another device.

13. The device of claim 11, wherein the bitmap associated with the receiver GSN is local to the receiver, wherein the receiver GSN is not sent to another device.

14. The device of claim 8, wherein the sender GSN and the receiver GSN are assigned from separate bitmaps, wherein the size of the bitmap is dependent on optimal transfer of data between the sender and the receiver.

15. A non-transitory computer-readable medium storing instructions when executed by one or more processors of a device, cause the device to:

assign a plurality of messages, associated with a request, to one or more queue pairs (QPs);

assign a message sequence number (MSN) to one of a one or more messages of the plurality of messages;

assign a sender global sequence number (GSN) to one of the one or more messages;

receive, via a receiver, the plurality of messages;

assign a receiver GSN to the one or more messages of the plurality of messages received;

track completion of the request, based on the MSN assigned, via a sender; and transmit the plurality of messages in order.

16. The computer-readable medium of claim 15, wherein the plurality of messages are packetized to a plurality of data packets to be transmitted between the sender to the receiver, and wherein the one or more messages are associated with a queue pair.

17. The computer-readable medium of claim 15, wherein the sender GSN is stored in a bitmap, wherein the bitmap maintains a record of sender GSNs assigned to prevent reuse of the sender GSNs.

18. The computer-readable medium of claim 15, wherein the receiver GSN is stored in a bitmap, wherein the bitmap maintains a record of receiver GSNs assigned to prevent reuse of the receiver GSNs.

19. The computer-readable medium of claim 17, wherein the bitmap associated with the sender GSN is local to the sender, wherein the sender GSN is not sent to another device.

20. The computer-readable medium of claim 18, wherein the bitmap associated with the receiver GSN is local to the receiver, wherein receiver GSN is not sent to another device.

* * * * *